(12) United States Patent
Hachtel et al.

(10) Patent No.: US 8,892,327 B2
(45) Date of Patent: Nov. 18, 2014

(54) METHOD FOR DETERMINING A FUNCTIONAL STATE OF A PRESSURE BUILD-UP VALVE, AND FUNCTION MONITORING DEVICE FOR A PRESSURE BUILD-UP VALVE OF A HYDRAULIC BRAKE BOOSTER

(75) Inventors: Juergen Hachtel, Moeckmuehl (DE); Ralf Kinder, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 13/564,798

(22) Filed: Aug. 2, 2012

(65) Prior Publication Data
US 2013/0035835 A1 Feb. 7, 2013

(30) Foreign Application Priority Data
Aug. 4, 2011 (DE) .......................... 10 2011 080 404

(51) Int. Cl.
| G06F 7/70 | (2006.01) |
| G06F 19/00 | (2011.01) |
| G06G 7/00 | (2006.01) |
| G06G 7/76 | (2006.01) |
| B60T 7/04 | (2006.01) |
| B60T 8/94 | (2006.01) |
| B60T 8/40 | (2006.01) |
| B60T 8/32 | (2006.01) |
| B60T 13/14 | (2006.01) |
| B60T 17/22 | (2006.01) |
| B60T 17/18 | (2006.01) |
| B60T 13/66 | (2006.01) |

(52) U.S. Cl.
CPC ............... *B60T 13/145* (2013.01); *B60T 7/042* (2013.01); *B60T 8/94* (2013.01); *B60T 8/4077* (2013.01); *B60T 8/3265* (2013.01); *B60T 17/22* (2013.01); *B60T 17/18* (2013.01); *B60T 13/662* (2013.01)
USPC ............................ 701/70; 701/32.1; 701/33.9

(58) Field of Classification Search
USPC ........... 701/70, 32.1, 33.9, 29.1, 1, 400, 33.6, 701/22, 301; 303/122, 113, 152, 146, 303/113.3, 114, 191, 155, 115.4; 280/428; 180/65.2, 337, 197; 123/350, 184; 340/905; 257/48; 348/148
See application file for complete search history.

(56) References Cited

U.S. PATENT DOCUMENTS 6,122,585 A * 9/2000 Ono et al. .................... 701/71
6,157,089 A * 12/2000 Xu .................................. 307/9.1

(Continued)

FOREIGN PATENT DOCUMENTS

DE 10 2008 044 002 5/2010

*Primary Examiner* — Thomas G Black
*Assistant Examiner* — Robert Payne
(74) *Attorney, Agent, or Firm* — Kenyon & Kenyon LLP

(57) ABSTRACT

A method for determining a functional state of a pressure build-up valve of a hydraulic brake booster of a brake system, having the following steps: comparing an activation intensity of an activation of a brake activating element of the brake system to a predefined minimum activation intensity; if the brake activation intensity is less than or equal to the minimum activation intensity, determining the functional state, taking into account a pressure change over time in at least a partial volume of the hydraulic brake booster; if the brake activation intensity is greater than the minimum activation intensity, determining the functional state, taking into account an operating mode which is predefined for a pressure reduction valve of the hydraulic brake booster. A function monitoring device for a pressure build-up valve of a hydraulic brake booster of a brake system is also described.

14 Claims, 3 Drawing Sheets

(56) References Cited

U.S. PATENT DOCUMENTS

| | | | |
|---|---|---|---|
| 6,289,271 B1* | 9/2001 | Isono et al. | 701/29.1 |
| 6,322,164 B1* | 11/2001 | Sakamoto et al. | 303/115.4 |
| 6,345,869 B1* | 2/2002 | Matsuo et al. | 303/116.1 |
| 6,851,762 B2* | 2/2005 | Kamiya et al. | 303/113.3 |
| 7,162,350 B2* | 1/2007 | Kato et al. | 701/70 |
| 7,206,684 B2* | 4/2007 | Takeda | 701/70 |
| 7,206,702 B2* | 4/2007 | Isono et al. | 702/41 |
| 7,236,870 B2* | 6/2007 | Tange et al. | 701/70 |
| 7,784,883 B2* | 8/2010 | Nomura et al. | 303/155 |
| 7,881,848 B2* | 2/2011 | Hayakawa et al. | 701/70 |
| 8,055,421 B2* | 11/2011 | Masuda et al. | 701/70 |
| 8,095,289 B2* | 1/2012 | Suzuki et al. | 701/70 |
| 8,195,371 B2* | 6/2012 | Yasui et al. | 701/70 |
| 8,315,754 B2* | 11/2012 | Ajiro | 701/22 |
| 8,332,113 B2* | 12/2012 | Yasui et al. | 701/70 |
| 8,447,486 B2* | 5/2013 | Nakata et al. | 701/70 |
| 8,457,854 B2* | 6/2013 | Lubbers | 701/70 |
| 8,463,519 B2* | 6/2013 | McCann | 701/70 |
| 8,485,157 B2* | 7/2013 | Ochiai et al. | 123/350 |
| 8,494,745 B2* | 7/2013 | Schneider et al. | 701/70 |
| 8,577,575 B2* | 11/2013 | Tomura et al. | 701/70 |
| 8,738,260 B2* | 5/2014 | Miyazaki et al. | 701/70 |
| 2001/0016795 A1* | 8/2001 | Bellinger | 701/53 |
| 2006/0142921 A1* | 6/2006 | Takeda | 701/70 |
| 2006/0142922 A1* | 6/2006 | Ozaki et al. | 701/70 |
| 2007/0255474 A1* | 11/2007 | Hayakawa et al. | 701/70 |
| 2008/0091309 A1* | 4/2008 | Walker | 701/1 |
| 2008/0103667 A1* | 5/2008 | Suzuki et al. | 701/70 |
| 2008/0255744 A1* | 10/2008 | Yasui et al. | 701/70 |
| 2009/0024291 A1* | 1/2009 | Masuda et al. | 701/70 |
| 2009/0187322 A1* | 7/2009 | Yasui et al. | 701/70 |
| 2009/0198426 A1* | 8/2009 | Yasui et al. | 701/70 |
| 2010/0179740 A1* | 7/2010 | Lubbers | 701/70 |
| 2010/0211282 A1* | 8/2010 | Nakata et al. | 701/70 |
| 2011/0066345 A1* | 3/2011 | Nasu et al. | 701/70 |
| 2012/0109482 A1* | 5/2012 | Yoshii | 701/70 |
| 2012/0150406 A1* | 6/2012 | Tomura et al. | 701/70 |
| 2012/0192555 A1* | 8/2012 | Hwang | 60/552 |
| 2012/0245815 A1* | 9/2012 | Schneider et al. | 701/70 |
| 2012/0259524 A1* | 10/2012 | Miyazaki et al. | 701/70 |
| 2012/0303232 A1* | 11/2012 | Yoshii | 701/70 |
| 2013/0173130 A1* | 7/2013 | Vollert et al. | 701/70 |
| 2013/0241275 A1* | 9/2013 | Miyazaki et al. | 303/6.01 |
| 2013/0297170 A1* | 11/2013 | Kunz et al. | 701/70 |
| 2013/0304311 A1* | 11/2013 | John et al. | 701/33.6 |
| 2014/0058639 A1* | 2/2014 | Svensson et al. | 701/70 |

* cited by examiner

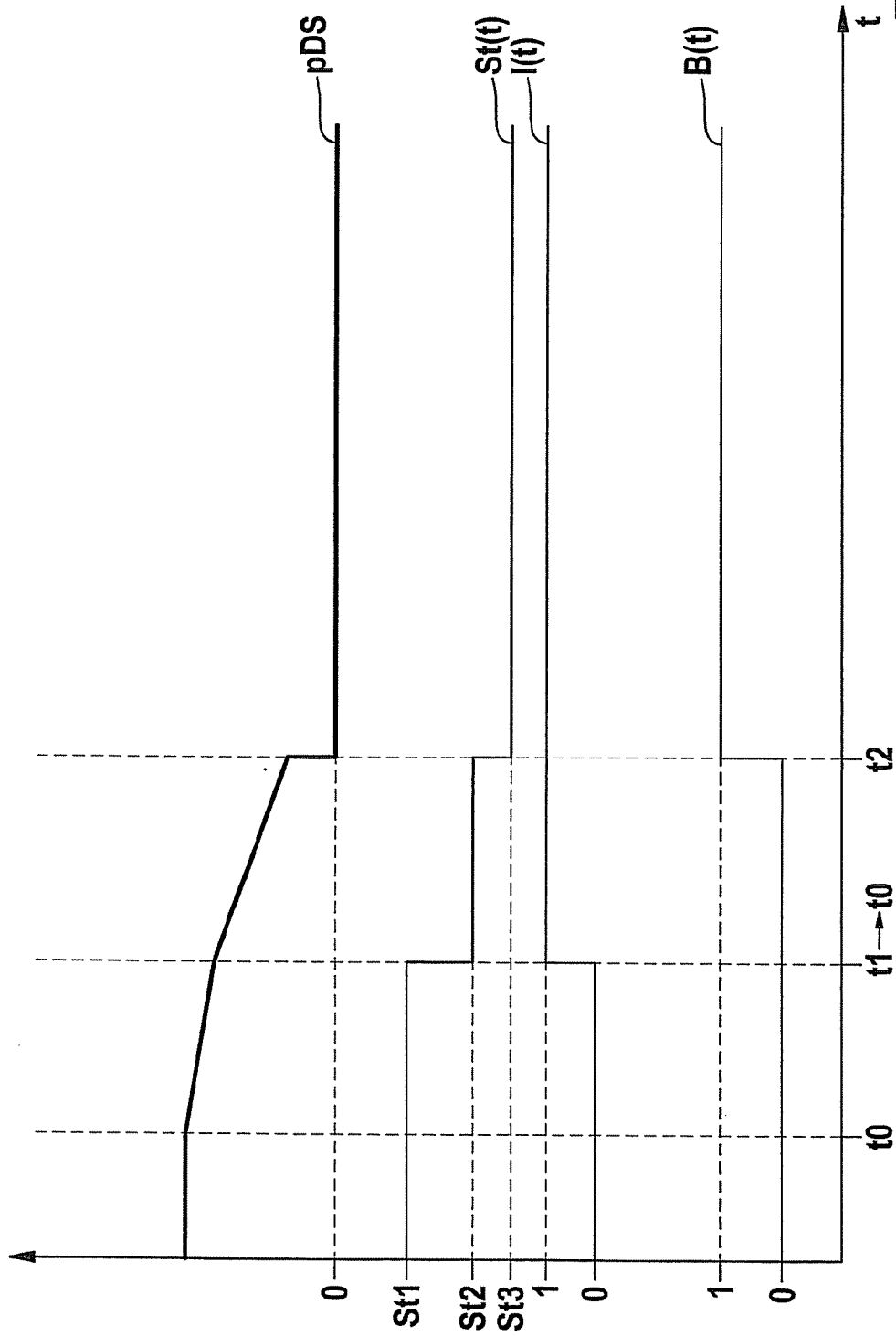

METHOD FOR DETERMINING A FUNCTIONAL STATE OF A PRESSURE BUILD-UP VALVE, AND FUNCTION MONITORING DEVICE FOR A PRESSURE BUILD-UP VALVE OF A HYDRAULIC BRAKE BOOSTER

CROSS REFERENCE TO RELATED APPLICATIONS

The present application claims priority to Application No. DE 10 2011 080 404.8, filed in the Federal Republic of Germany on Aug. 4, 2011, which is expressly incorporated herein in its entirety by reference thereto.

FIELD OF INVENTION

The present invention relates to a method for determining a functional state of a pressure build-up valve of a hydraulic brake booster of a brake system. Moreover, the present invention relates to a method for operating a hydraulic brake booster of a brake system and a method for operating a brake system. The present invention further relates to a function monitoring device for a pressure build-up valve of a hydraulic brake booster of a brake system, a hydraulic brake booster for a brake system, and a brake system for a vehicle.

BACKGROUND INFORMATION

A brake system for a motor vehicle is described in German Application No. DE 10 2008 044 002 A1. The brake system has a hydraulic brake booster having a pressure accumulator which is chargeable with the aid of a pump, and which via a pressure build-up valve is hydraulically connected to a booster cylinder situated between a brake pedal and a brake master cylinder of the brake system. The aim is to allow a pressure that is present in the booster cylinder to be increased by at least partially opening the pressure build-up valve. In this way, at least one displaceable piston mounted in the brake master cylinder may be acted on by an additional force for increasing a pressure that is present in the brake master cylinder.

SUMMARY OF THE INVENTION

The present invention provides a method for determining a functional state of a pressure build-up valve of a hydraulic brake booster of a brake system, a method for operating a hydraulic brake booster of a brake system, a method for operating a brake system which has a hydraulic brake booster, a function monitoring device for a pressure build-up valve of a hydraulic brake booster of a brake system, a hydraulic brake booster for a brake system, and a brake system for a vehicle.

The present invention allows advantageous monitoring of the at least one pressure build-up valve of the hydraulic brake booster which is able to respond to the activation of the brake activating element. Thus, with the aid of the present invention the risk may be eliminated that an error state which is not present is erroneously determined as the functional state of the pressure build-up valve due to a response of the hydraulic brake booster attributable to activating the brake activating element. Likewise, with the aid of the present invention an error state, if it is present, is determinable for the pressure build-up valve, even during an activation of the brake activating element. In particular, reliable detection of a gross leak is ensured.

With the aid of the present invention, if a functional impairment occurs in the at least one pressure build-up valve of the hydraulic brake booster, in particular if there is a gross leak at the at least one pressure build-up valve, a rapid response to this state may be made, and the hydraulic brake booster, i.e., the brake system, may be controlled into a safe operating state. Even if there is a gross leak of the pressure build-up valve of the hydraulic brake booster, a transition of the brake system into an operationally reliable state may still be carried out. At the same time, a driver braking input may still be implemented, while braking not specified by the driver is preventable despite the gross leak.

Further features and advantages of the present invention are described below with reference to the accompanying figures.

BRIEF DESCRIPTION OF THE DRAWINGS

FIG. 3 shows a coordinate system for illustrating an exemplary embodiment of the method for operating a hydraulic brake booster of a brake system, and the method for operating a brake system having a hydraulic brake booster.

DETAILED DESCRIPTION

Figure 1:
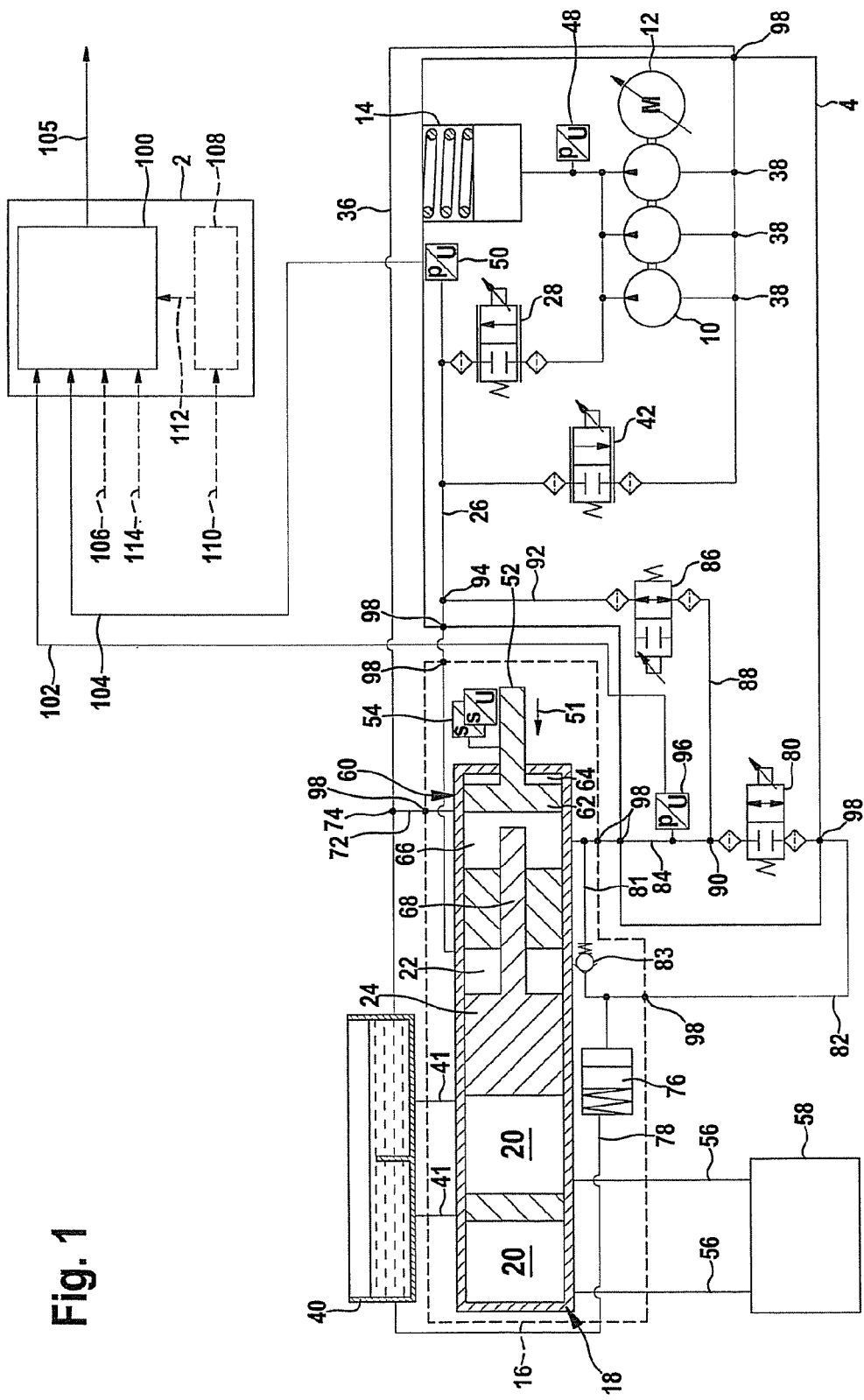
FIG. 1 shows an exemplary embodiment of the function monitoring device.

FIG. 1 shows an exemplary embodiment of the function monitoring device.

The advantageous cooperation of function monitoring device 2 with a brake system having a hydraulic brake booster 4 schematically represented in FIG. 1 is described below. However, it is pointed out that the described design of the brake system, in particular of hydraulic brake booster 4, is to be understood only as an example. The usability of function monitoring device 2 is not limited to a hydraulic brake booster 4 or a specific type of brake system having this type of design.

The brake system schematically represented in FIG. 1 has an accumulator charge pump 10 having a motor 12, via which a pressure may be built up in a pressure accumulator 14. This may also be described in such a way that pressure accumulator 14 is chargeable with the aid of accumulator charge pump 10. Pressure accumulator 14 may in particular be designed as a high-pressure accumulator. However, function monitoring device 2 described in greater detail below is not limited to a hydraulic brake booster 4 having a specific type of pressure accumulator 14. Likewise, the design of accumulator charge pump 10 as a three-piston pump is to be understood only as an example.

In the exemplary embodiment in FIG. 1, pressure accumulator 14 is hydraulically connected to an actuator circuit 16, which includes at least one brake master cylinder 18 of the brake system, in such a way that an internal pressure in at least one pressure chamber 20 of brake master cylinder 18 may be increased by the pressure built up in pressure accumulator 14. Pressure accumulator 14 thus functions as a (hydraulic) brake booster of the brake system. As described in greater detail below, the illustrated brake system having hydraulic brake booster 4 may be used in a hybrid or electric vehicle. The illustrated brake system may therefore be referred to as HAS HEV (hydraulic actuation system for hybrid electrical vehicles). However, the usability of function monitoring device 2 described herein is not limited to a hybrid or electric vehicle.

Brake master cylinder 18 may be designed as a tandem brake master cylinder. However, the brake system having actuator circuit 16 described below is not limited to this type of brake master cylinder 18.

Pressure accumulator 14 is preferably hydraulically connected to a prechamber 22 of brake master cylinder 18 which functions as a booster cylinder. Prechamber 22 may be understood to mean an internal volume of brake master cylinder 18, a displaceable component 24 of brake master cylinder 18 delimiting prechamber 22 with respect to the at least one pressure chamber 20 in such a way that a total volume composed of prechamber 22 and the at least one pressure chamber 20 remains constant, even when displaceable component 24 is displaced. Thus, an increase in volume of prechamber 22 causes compression of the at least one pressure chamber 20, and results in a corresponding increase in the internal pressure in the at least one pressure chamber 20. Similarly, a decrease in volume of prechamber 22 may cause an increase in volume of the at least one pressure chamber 20, thus reducing the internal pressure in the at least one pressure chamber 20.

However, the designability of actuator circuit 16 which cooperates with hydraulic brake booster 4 is not limited to a design of the booster cylinder as a prechamber 22 of brake master cylinder 18. For example, the booster cylinder which is hydraulically connected to pressure accumulator 14 may also be situated spatially separate from brake master cylinder 18. In this case, the pressure built up in the booster cylinder may be conducted to the brake master cylinder via a line. Various designs of the booster cylinder are known, and therefore are not discussed here in greater detail.

In the exemplary embodiment described here, accumulator charge pump 10 and pressure accumulator 14 are hydraulically connected to prechamber 22 via a line 26. (A hydraulic connection of two components may be understood to mean that displacement of brake fluid from the first component into the second component is ensured at least when a valve possibly situated in-between is in an at least partially open state.) At least one pressure build-up valve 28 is situated in the hydraulic connection between pressure accumulator 14 and prechamber 22 in such a way that a brake fluid volume is displaceable from pressure accumulator 14 through the at least one pressure build-up valve 28, which is controlled into the at least partially open state, and into prechamber 22.

In one refinement not illustrated, multiple pressure build-up valves 28 may also be hydraulically connected to pressure accumulator 14 via at least one branch point, and to prechamber 22 via at least one further branch point. Use of three pressure build-up valves 28 may be advantageous, in particular when accumulator charge pump 10 is designed as a three-piston pump. Thus, hydraulic brake booster 4 described below is not limited to a specific number of pressure build-up valves 28.

An intake side of accumulator charge pump 10 is connected to a brake fluid reservoir 40, for example via at least one branch point 38 provided in a reservoir line 36. Brake fluid reservoir 40 may be connected to the at least one pressure chamber 20 of brake master cylinder 18 via at least one flowthrough opening 41 such as a "snifter hole," for example.

The intake side of accumulator charge pump 10 is preferably also hydraulically connected to prechamber 22 via at least one pressure reduction valve 42 (discharge valve). In this case, after the at least one pressure reduction valve 42 has at least partially opened, a brake fluid volume may be pumped from prechamber 22 through the at least one open pressure reduction valve 42 into pressure accumulator 14 with the aid of accumulator charge pump 10. Likewise, the brake fluid volume may be displaced from prechamber 22 through the at least one open pressure reduction valve 42 into brake fluid reservoir 40 via reservoir line 36. This causes a rapid decrease in the volume of prechamber 22, and thus, a rapid reduction in pressure in the at least one pressure chamber 20 of brake master cylinder 18. In one refinement, multiple pressure reduction valves 42, in particular a number that is equal to the number of pressure build-up valves 28, may be connected to prechamber 22 via at least one branch point, and to accumulator charge pump 10 and/or reservoir line 36 via a further branch point.

Hydraulic brake booster 4 may be controlled using at least one sensor 48 or 50. For example, a pressure accumulator sensor 48 may be situated at the delivery side of accumulator charge pump 10 and brake fluid reservoir 40. A dynamic pressure sensor 50, which may also be designed as a pressure sensor, is preferably connected to line 26.

By opening and closing valves 28 and 42, preferably taking the provided sensor signals of the at least one sensor 48 or 50 into account, the volume of prechamber 22 may be adjusted in such a way that an internal pressure which corresponds to a setpoint vehicle deceleration specified by an adaptive cruise control (ACC) system and/or an emergency braking system is actively adjusted in the at least one pressure chamber 20. Thus, hydraulic brake booster 4 may be used in a brake system which is equipped with an adaptive cruise control system and/or an emergency braking system.

Likewise, a driver may be assisted by hydraulic brake booster 4 when activating a brake activating element 52 for reducing a vehicle speed, such as a brake pedal in particular. For example, a setpoint deceleration of the vehicle speed specified by the driver may be determined with the aid of at least one brake activation sensor 54, for example with the aid of a brake force sensor and/or a braking distance sensor. The volume of prechamber 22/the pressure in prechamber 22 may subsequently be actively adjusted, with the aid of hydraulic brake booster 4, in such a way that a desired brake pressure is present in at least one brake circuit 58 (only schematically represented here) which is hydraulically connected to the at least one pressure chamber 20 via a supply line 56, or in at least one wheel brake cylinder (not illustrated) of the at least one brake circuit 58. It is pointed out that the brake system represented here is not limited to a specific design of the at least one brake circuit 58. Therefore, the at least one brake circuit 58 is not discussed in greater detail.

Hydraulic brake booster 4 thus ensures improved braking comfort for the user of the brake system. In particular, in one advantageous mode of operation of hydraulic brake booster 4, a multiple of a driver brake force exerted on brake activating element 52 may be applied to displaceable component 24. Thus, the driver himself does not have to exert the entire force to be applied to brake activating element 52 in order to build up the desired brake pressure.

The illustrated brake system may also be used together with a generator (not illustrated) for braking a vehicle. In this case, with the aid of hydraulic brake booster 4 the brake pressure that is present in the at least one brake circuit 58 may be varied, taking an increase or decrease of the generator braking torque into account. For example, the brake pressure in the at least one brake circuit 58 corresponding to an increase in the generator braking torque over time may be reduced by reducing the brake fluid volume filled into prechamber 22 with the aid of the at least one open pressure reduction valve 42. Likewise, by transferring a further brake fluid volume from pressure accumulator 14 into prechamber 22 via the at least one open pressure build-up valve 28, the brake pressure in the at least one brake circuit 58 may be increased in such a way that a decrease in the generator braking torque over time is compensated for. Advantageous blinding of the generator braking torque may thus be carried out with the aid of hydraulic brake booster 4.

A sensing cylinder 60 may be provided between brake activating element 52 and brake master cylinder 18 to ensure additional convenience of use for the user of the brake system. For example, brake activating element 52 (only schematically represented here) may be connected to a displaceable component 62 of sensing cylinder 60 which divides a total internal volume of sensing cylinder 60 into a prechamber 64 and a sensing chamber 66. In this case, displaceable component 24 of brake master cylinder 18 may be connected to a bolt 68 which protrudes at least partially into pressure chamber 66 of sensing cylinder 60. The pressure in sensing chamber 66 is preferably variable via a pressure adjusting device, which is described in greater detail below.

By using this type of sensing cylinder 60 together with a pressure adjusting device, a resetting action which is decoupleable from the internal pressure in the at least one pressure chamber 20 of brake master cylinder 18 may be exerted on brake activating element 52. In this case, the driver perceives a standard braking feel (pedal feel) despite a variation in the brake pressure in the at least one brake circuit 58 for blinding the generator braking torque. At the same time, the driver has the option of actively braking into brake master cylinder 18 via sensing cylinder 60.

Sensing chamber 66 of sensing cylinder 60 may be hydraulically connected via a line 72 to a branch point 74 formed in reservoir line 36. The hydraulic connection is preferably provided between sensing chamber 66 of sensing cylinder 60 and line 72 as an opening which is closed when brake activating element 53 is slightly activated. On the other hand, a hydraulic connection between sensing chamber 66 of sensing cylinder 60 and a spring chamber 76 may be designed in such a way that the spring chamber is not closed/sealed off even when brake activating element 52 is strongly activated. Spring chamber 76 may be connected to brake fluid reservoir 40 via a further reservoir line 78. The pressure in sensing chamber 66 may be actively adjusted to a desired value via a simulator valve 80 which is connected to spring chamber 76 via a line 82, and is connected to sensing chamber 66 via a line 84, and which may be designed as a continuously controllable valve. A line 81 may also be situated between line 84 and spring chamber 76 together with a pressure relief valve 83, parallel to simulator valve 80. In this case, pressure relief valve 83 is preferably oriented in such a way that a displacement of brake fluid from sensing chamber 66 to spring chamber 76 via line 81 is prevented by pressure relief valve 83.

A shutoff valve 86 is connected via a line 88 to a branch point 90 formed in line 84, and is connected via a line 92 to a branch point 94 formed in line 26. Shutoff valve 86 creates a pressure compensation path when there is a leak in the at least one pressure build-up valve 28, and when brake booster 2 is in a nonenergized mode. For this purpose, shutoff valve 86 is preferably designed as a valve that is de-energized when open. In addition, at least one sensing chamber pressure sensor 96 may be situated between shutoff valve 86 and sensing chamber 66, and/or in sensing chamber 66. In particular, a configuration of sensing chamber pressure sensor 96 between shutoff valve 86 and sensing chamber 66 is easily implemented, and ensures advantageous usability of function monitoring device 2, as will be explained in greater detail below.

Hydraulic brake booster 4, actuator circuit 16, and brake fluid reservoir 40 may be easily connected to one another via terminal connections 98, and/or mounted in a vehicle.

The function and the schematic layout of function monitoring device 2 are discussed in greater detail below.

Function monitoring device 2 is designed to check/monitor/control the mode of operation of the at least one pressure build-up valve 28 of hydraulic brake booster 4. At least one gross leak at the at least one pressure build-up valve 28 is quickly and reliably detectable with the aid of function monitoring device 2, and the risk of an incorrect assumption of a gross leak at the at least one pressure build-up valve 28 which has not occurred is negligible.

Function monitoring device 2 includes an evaluation device 100 which is controllable into a first operating mode in which a functional state of the (at least one) pressure build-up valve 28 is determinable, taking into account at least one provided first information item 102 concerning a pressure change over time in at least a partial volume of hydraulic brake booster 4. In addition, evaluation device 100 is controllable into a second operating mode in which the functional state of the (at least one) pressure build-up valve 28 is determinable, taking into account at least one provided second information item 104 concerning an operating mode which is specified for the (at least one) pressure reduction valve 42 of hydraulic brake booster 4. An evaluation signal 105 having the determined functional state is subsequently outputtable to a warning device, a vehicle control system, a brake system control device, a vehicle information memory device, and/or a repair shop messaging device.

Evaluation device 100 may be controlled into the first operating mode or into the second operating mode, for example with the aid of a control signal 106 provided by brake activation sensor 54 and/or a central vehicle control system (not illustrated). This may be achieved in that brake activation sensor 54 or the central vehicle control system is designed to output control signal 106 for controlling evaluation device 100 at least from the second operating mode into the first operating mode, provided that an activation intensity of an activation of brake activating element 52 by the driver is less than or equal to a minimum activation intensity such as zero, for example. Similarly, it is advantageous if brake activation sensor 54 or the central vehicle control system is designed to output control signal 106 for controlling evaluation device 100 at least from the first operating mode into the second operating mode to function monitoring device 2, provided that the brake activation intensity is greater than the minimum activation intensity. The design of function monitoring device 2 may be simplified as a result of this functionality of brake activation sensor 54 or of the central vehicle control system.

As an alternative, function monitoring device 2 may also include a first comparator 108, via which a provided brake activation intensity variable 110 may be compared to a predefined minimum activation intensity variable with regard to the activation intensity of the activation of brake activating element 52. If brake activation intensity variable 110 is less than or equal to the minimum activation intensity variable, first comparator 108 is preferably designed to control evaluation device 100 at least from the second operating mode into the first operating mode with the aid of a control signal 112. Similarly, if at least brake activation intensity variable 110 is greater than the minimum activation intensity variable, first comparator 108 may be designed to control evaluation device 100 at least from the first operating mode into the second operating mode with the aid of control signal 112.

Brake activation intensity variable 110, which is providable with the aid of brake activation sensor 54, for example, may include a brake force, a brake pressure, or a braking distance. Likewise, brake activation intensity variable 110 may include at least one variable which is convertible into a brake force, a brake pressure, or a braking distance with the aid of an evaluation relation. However, the design of first comparator 108 is not limited to a comparison of a specific brake activation intensity variable 110.

Evaluation device 100 which is controlled into the first operating mode is preferably designed to compare a pressure change variable, provided as first information item 102, to a predefined limiting pressure change variable with regard to a change in a pressure in a volume, such as in a surrounding of sensor 96, for example, that is hydraulically connected to pressure accumulator 14 via pressure build-up valve 28. If the pressure change variable is greater than the limiting pressure change variable, a predefined error state may be determined as the functional state of pressure build-up valve 28. Similarly, if a pressure change variable is less than or equal to the limiting pressure change variable, a normal state may be determined as the functional state of the pressure build-up valve.

In one advantageous embodiment, the pressure change variable is provided as first information item 102 by a sensor 96 situated between shutoff valve 86 and sensing chamber 66, and/or by a pressure sensor situated at or in sensing cylinder 60. Since a pressure change in sensing cylinder 60 when brake activating element 52 is not activated is attributable to a pressure change, i.e., a pressure change which occurs over time, in hydraulic brake booster 4, a pressure sensor situated outside hydraulic brake booster 4 may also be used for providing first information item 102. Providing the pressure change variable with the aid of sensor 96 situated between shutoff valve 86 and sensing chamber 66 is also particularly advantageous, since shutoff valve 86, as a valve that is de-energized when open, is generally not energized when brake activating element 52 is not activated, and therefore is in an open state when evaluation device 100 is operated in the first operating mode.

In other words, when the at least one pressure build-up valve 28 is in a leaky state, in particular when there is a gross leak of the at least one pressure build-up valve 28, the volume flowing in from pressure accumulator 14 into actuator circuit 16 is able to flow off only via the pressure compensation path created by open shutoff valve 86. This results in a rapid/steep rise in the pressure between shutoff valve 86 and sensing chamber 66, and in sensing chamber 66. The rapid/steep rise in the pressure is thus a clear indication of the presence of a leak of the at least one pressure build-up valve 28, in particular a gross leak at the at least one pressure build-up valve 28.

As an alternative or in addition to the above-described exemplary embodiment, evaluation device 100 in the first operating mode may also be designed to evaluate a pressure accumulator internal pressure change variable, provided as first information item 102 by pressure accumulator sensor 48 situated at pressure accumulator 14, in order to determine the functional state of the at least one pressure build-up valve 28. This is likewise advantageous, since the presence of the at least one pressure build-up valve 28 in a leaky state, in particular its gross leak, may also cause a severe pressure drop in pressure accumulator 14.

Evaluation device 100 which is controlled into the second operating mode is advantageously designed to compare a current intensity signal, provided as second information item 104, via which the at least one pressure reduction valve 42, via which a discharge side of the at least one pressure build-up valve 28 is connected to brake fluid reservoir 40, is controllable, to a predefined limiting current intensity signal. If the current intensity signal is greater than the limiting current intensity signal, the predefined error state may likewise be set as the functional state of the at least one pressure build-up valve 28. Similarly, if a current intensity signal is less than or equal to the limiting current intensity signal, the normal state may be determined as the functional state of the at least one pressure build-up valve 28.

Function monitoring device 2 described here thus makes use of the advantage that during an activation of brake activating element 52, a dynamic pressure at the discharge side of the at least one pressure build-up valve 28 is compensatable to a significant degree via the at least one pressure reduction valve 42. The dynamic pressure may be compensated for in particular by using dynamic pressure sensor 50. For example, dynamic pressure sensor 50 is able to compare the actual pressure present at the discharge side of the at least one pressure build-up valve 28 to a setpoint pressure, and if the actual pressure is greater than the setpoint pressure, control the at least one pressure reduction valve 42 by energizing the valve into an at least partially open state. The current intensity signal which is providable to the at least one pressure reduction valve 42 with the aid of dynamic pressure sensor 50 thus corresponds to the dynamic pressure to be compensated for. If a significantly high current intensity signal is present at least for a predefined period of time, it is thus possible to conclude with a high degree of reliability that a leak is present at the at least one pressure build-up valve 28.

In particular when there is a gross leak of the at least one pressure build-up valve 28, the current intensity signal additionally provided as second information item 104 to evaluation device 100 is thus comparatively large. For example, instead of a current intensity signal of 50 mA which is output to the at least one pressure reduction valve 42 during normal operation thereof, a current intensity signal which is greater than 100 mA over a comparatively long time interval is provided to the at least one pressure reduction valve 42. Since the current intensity signal, which is also outputtable to the at least one pressure reduction valve 42, may be easily compared to a reference value, the gross leak of the at least one pressure build-up valve 28 may be detected with the aid of an easily designable electronics system of evaluation device 100.

As an alternative or in addition to a comparison of the current intensity signal as second information item 104, an operating mode of the at least one pressure reduction valve 42 may also be tested, with the aid of an additional sensor (not illustrated), as to whether a dynamic pressure reduction which is above average in duration and/or intensity occurs with the aid of the at least one pressure reduction valve 42. The additional sensor may be designed, for example, to ascertain an opening duration and/or an opening width of the at least one pressure reduction valve 42, and to output same as at least part of second information item 104 to the evaluation device.

Likewise, the additional sensor may be designed to ascertain a flowthrough intensity of a brake fluid quantity flowing through the at least one pressure reduction valve 42, and to output same as at least part of second information item 104 to evaluation device 100. In one refinement, the additional sensor may also be designed to compare the opening duration, the opening width, and/or the flowthrough intensity to at least one comparative value, and to provide an exceedance signal as at least part of second information item 104 to evaluation device 100 if the at least one comparative value is exceeded.

The advantageous design of function monitoring device 2 in its second operating mode thus takes into account that during activation of brake activating element 52 (which generally triggers energization, and thus closing, of shutoff valve 86) a significant pressure build-up may also occur in the at least one sensing chamber 66, regardless of a leak at the at least one pressure build-up valve 28. The advantageous design of function monitoring device 2, having evaluation device 100 which is controllable into the second operating mode, thus ensures that a pressure build-up in sensing chamber 66 when brake activating element 52 is activated is not erroneously interpreted as a leak occurring at the at least one pressure build-up valve 28.

In one advantageous refinement, evaluation device 100 may also be controllable into a deactivated mode for a predefined time interval. Evaluation device 100 may preferably be controlled into the deactivated mode with the aid of a second control signal 114 which is provided by brake activation sensor 54 or the central vehicle control system. Brake activation sensor 54 or the central vehicle control system preferably outputs second control signal 114 for controlling evaluation device 100 into the deactivated mode after an activation speed and/or an activation acceleration of the activation of brake activating element 52 is/are ascertained to be greater than a predefined minimum activation speed and/or a predefined minimum activation acceleration, respectively. As a result of the advantageous design of brake activation sensor 54 or the central vehicle control system for controlling evaluation device 100 into the deactivated state at a comparatively high brake activation speed and/or brake activation acceleration, it may reliably be ruled out that (very) heavy braking, for example panic braking, is erroneously interpreted as a leak at the at least one pressure build-up valve 28.

Since (very) heavy braking such as panic braking, for example, is easily recognizable based on the comparatively high values of the brake activation speed and/or the brake activation acceleration, this type of situation is thus reliably recognizable based on the analysis proposed herein. Evaluation device 100 used as a recognition logic system may be temporarily deactivated by controlling evaluation device 100 into the deactivated mode for a predefined time interval.

As an alternative to the above-described advantageous design of brake activation sensor 54 or of the central vehicle control system, function monitoring device 2 may also include a second comparator (not illustrated) via which a provided activation speed variable and/or a provided activation acceleration variable may be compared to a predefined minimum activation speed variable and/or to a predefined minimum activation acceleration variable with regard to the activation speed and/or the activation acceleration, respectively, of the activation of brake activating element 52. If the activation speed variable is greater than the predefined minimum activation speed variable, and/or the activation acceleration variable is greater than the predefined minimum activation acceleration variable, the second comparator is preferably designed to control evaluation device 100 into the deactivated mode for a predefined time interval. In addition, by equipping function monitoring device 2 with the second comparator described here, misinterpretation of (very) heavy braking such as panic braking, for example, as a leak at the at least one pressure build-up valve 28 may be prevented.

For a (massive) leak in the at least one pressure build-up valve 28, for example due to a valve rupture, the brake fluid present in pressure accumulator 14 escapes into actuator circuit 16. However, due to the system design described herein, triggering of an uncontrolled static pressure build-up on account of the leak is reliably prevented. In addition, with the aid of function monitoring device 2 described in the above paragraphs, the functional impairment of the at least one pressure build-up valve 28 is quickly recognizable at an early point in time, so that even at high volume flows, which may sometimes occur during a massive valve leak of the at least one pressure build-up valve 28, even a brief occurrence of brake pressure in actuator circuit 16 generated by the volume flows, often referred to as dynamic pressure, is quickly preventable. Thus, temporary deceleration which is not intended by the driver may be prevented, even at high volume flows, with the aid of function monitoring device 2.

In one refinement, function monitoring device 2 may also be designed to carry out the method steps described below for counteracting dynamic pressure at an early point in time.

Figure 2A:
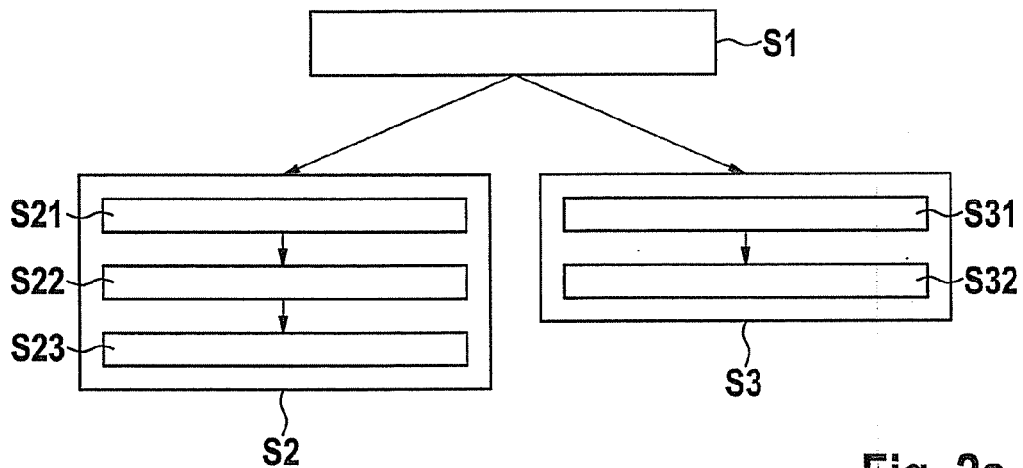
FIGS. 2a and 2b show a flow chart and a coordinate system, respectively, for illustrating an exemplary embodiment of the method for determining a functional state of a pressure build-up valve.
Figure 2B:
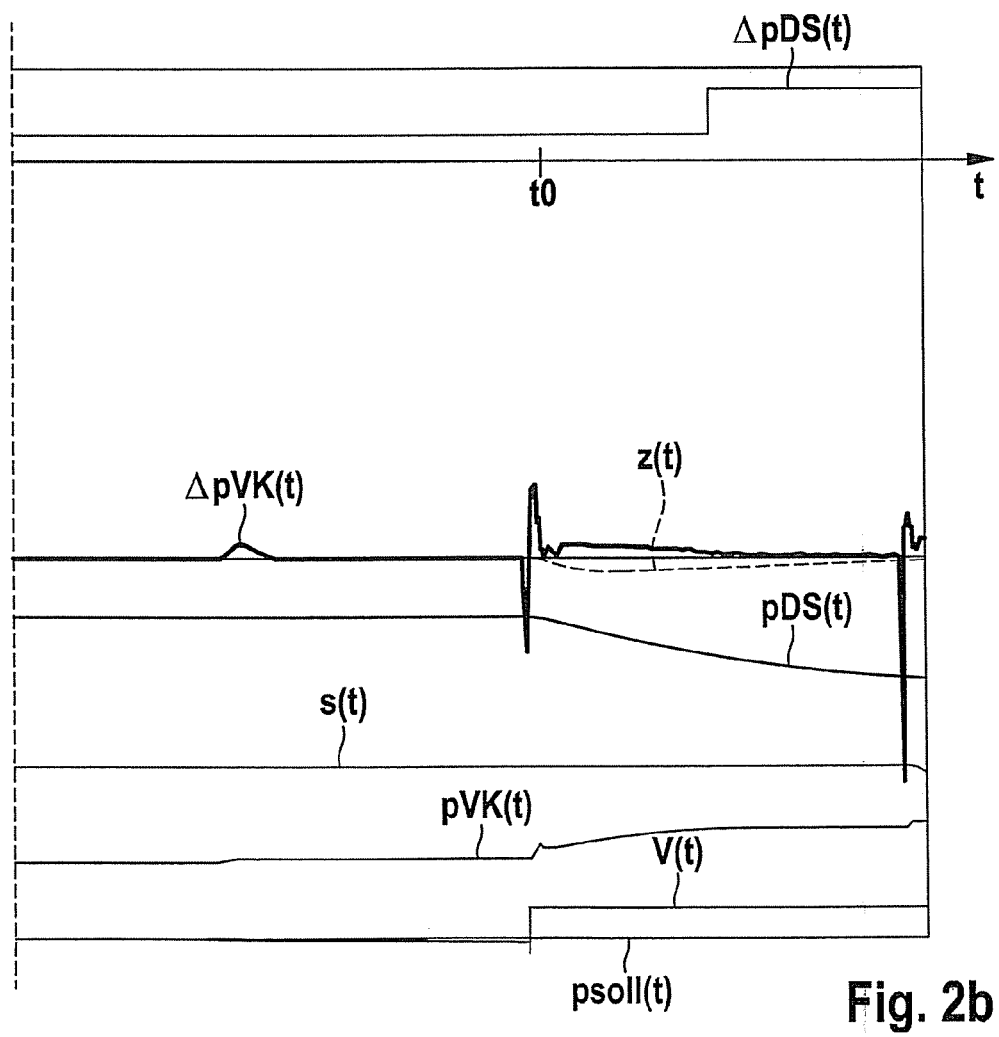

FIGS. 2a and 2b show a flow chart and a coordinate system, respectively, for illustrating an exemplary embodiment of the method for determining a functional state of a pressure build-up valve.

The method described below may be carried out, for example, with the aid of the above-described function monitoring device. However, the practicability of the method is not limited to the use of this type of function monitoring device. Likewise, the practicability of the method is also not limited to the above-described design of the hydraulic brake booster and/or of the brake system.

An activation intensity of activating a brake activating element of the brake system is compared to a predefined minimum activation intensity in a method step S1. The minimum activation intensity is preferably a braking distance, a brake pressure, or a brake force equal to zero. However, the practicability of method step S1 is not limited to such a minimum activation intensity.

If the brake activation intensity is less than or equal to the minimum activation intensity, for example because the driver does not activate the brake activating element, method step S2 is carried out. The functional state of the pressure build-up valve, taking into account a pressure change over time in at least a partial volume of the hydraulic brake booster, is determined in method step S2. The determination of the functional state, taking into account the pressure change in the hydraulic brake booster over time, may include method steps S21 through S23, for example. In this case, a pressure change variable with regard to a change of a pressure in a volume that is hydraulically connected to a pressure accumulator of the hydraulic brake booster via the pressure build-up valve is ascertained in a method step S21. This may be understood to mean, for example, that the pressure change variable between the above-described shutoff valve and the sensing chamber and/or within the sensing chamber is ascertained. However, the practicability of method step S21 is not limited to the volumes stated here as an example. A pressure change in the particular volume may be determined as the pressure change variable with the aid of a pressure sensor. However, instead of a pressure difference, a variable which is convertible into a pressure difference may be ascertained as the pressure change variable in method step S21. Likewise, a pressure change variable with regard to a change in pressure in the pressure accumulator may also be measured in method step S21.

The ascertained pressure change variable is compared to a predefined limiting pressure change variable in a method step S22. If the pressure change variable is greater than the limiting pressure change variable, a predefined error state is determined as the functional state of the pressure build-up valve in a method step S23. A gross leak state, for example, may be determined as the predefined error state. If the pressure change variable is less than the limiting pressure change variable, in one refinement (not illustrated) a normal state may also be determined as the functional state of the pressure build-up valve.

FIG. 2b shows a coordinate system for explaining one exemplary embodiment of method step S2. In the coordinate system in FIG. 2b, the abscissa is a time axis t. Graph s(t) represents the braking activation distance (pedal travel) at point in time t as an example of the brake activation intensity. Graph psoll(t) is the (hydraulic) setpoint braking torque of the at least one wheel brake caliper of the brake system at point in time t, which is specifiable by the driver via braking activation distance s(t). Graph V(t) represents the brake fluid flow which flows through the pressure build-up valve at point in time t. Graphs pDS(t) and pVK(t) represent the pressures present at point in time t in the pressure accumulator and in the prechamber, respectively. Graphs ΔpDS(t) and ΔpVK(t) indicate the respective changes in these pressures over time. The meter curve over function ΔpVK, i.e., the area beneath function ΔpVK(t), is likewise plotted, together with function z(t), in the coordinate system in FIG. 2b.

The driver does not activate the brake activating element while method step S2 is being carried out. Braking activation distance s(t) is thus a constant equal to zero. Similarly, setpoint braking torque psoll(t) is also equal to zero while method step S2 is being carried out. The full functionality of the pressure build-up valve is ensured up to point in time t0. Since the brake activating element is not activated, the pressure build-up valve is therefore in its closed state up to point in time t0 while method step S2 is being carried out. Volume V(t) conducted through the pressure build-up valve at points in time t less than t0 is therefore equal to zero.

Prior to point in time t0, the at least one pressure build-up valve is in a state in which its functionality is reliably ensured. Pressure pVK(t) in the prechamber is therefore comparatively low due to the nonactivation of the brake activating element, while pressure pDS(t) in the charged pressure accumulator is relatively high. Pressure changes ΔpVK(t) and ΔpDS(t) are equal to zero up to point in time t0 during method step S2.

A leak occurs at the at least one pressure build-up valve at point in time t0. Thus, beginning at point in time t0, a brake fluid flow V(t), not equal to zero, flowing through the pressure build-up valve until point in time t flows through the at least one pressure build-up valve, although a braking activation distance s(t) equal to zero is still present.

As is apparent with reference to function ΔpVK(t), the pressure change in the prechamber is not equal to zero beginning at point in time t0. In addition, the pressure change in the prechamber increases with a comparatively large slope beginning at point in time t0, and reaches a distinct maximum. This process is reliably recognizable with the aid of method step S2, in particular with the aid of method step S22. Thus, even before pressure pVK(t) present in the prechamber increases to a comparatively high value, the leak in the at least one pressure build-up valve may be reliably detected. In particular, the leak in the at least one pressure build-up valve may be reliably detected long before pressure pDS(t) in the pressure accumulator drops below a minimum value.

The significant increase in the pressure change ΔpVK(t) in the prechamber is a clear indication of a leak at the at least one pressure build-up valve. If this behavior continues over a certain period of time, i.e., if function z(t) exceeds a threshold value, it may be unambiguously concluded that a leak is present at the pressure build-up valve.

It is thus possible to respond early to the detected leak. In particular, it may thus be prevented that the increase in the pressure pVK(t) in the prechamber results in undesirable braking of the vehicle.

If at least the brake activation intensity is greater than the minimum activation intensity, a method step S3 is carried out instead of method step S2. The functional state of the pressure build-up valve, taking into account an operating mode which is predefined for a pressure reduction valve of the hydraulic brake booster, via which a discharge side of the pressure build-up valve is connected to the brake fluid reservoir, is determined in method step S3. For this purpose, method step S3 preferably includes method steps S31 and S32. A current intensity signal which is provided to the at least one pressure reduction valve is compared to a predefined limiting current intensity signal in a method step S31. If the current intensity signal is greater than the limiting current intensity signal, the predefined error state may be determined as the functional state of the pressure build-up valve in a subsequent method step S32. In this case as well, a gross leak state may be determined as the predefined error state. Likewise, if the current intensity signal is less than the limiting current intensity signal, the normal state may be determined as the functional state of the pressure build-up valve.

Carrying out method steps S31 and S32 has the advantage that a current intensity signal provided to the pressure reduction valve for controlling the pressure reduction valve is also usable for ascertaining a functionality of the at least one pressure build-up valve. In particular, a sensor for measuring a brake fluid flow through the at least one pressure reduction valve may be spared in this way. However, it is pointed out that method steps S31 and S32 merely represent exemplary embodiments for method step S3. Thus, instead of carrying out method steps S31 and S32, the current flow through the at least one pressure reduction valve may be directly measured and subsequently evaluated.

The method described in the above paragraphs is able to respond to the various modes of operation of the hydraulic brake booster when the brake activating element is activated, and when the brake activating element is not activated. In other words, the method is able to detect a leak at the inlet valve, regardless of whether the pressure controller is active or passive. Since different detection methods are implemented for both operating states with the aid of method steps S2 and S3, misinterpretation of a pressure increase in the booster chamber as a leak of the at least one inlet valve may be ruled out, even during an activation of the brake activating element.

Although the behavior of a hydraulic brake system is generally highly dependent on temperature, carrying out the above-described method allows robust parameterization which is independent of temperature. While conventional methods generally require a temperature sensor due to the strong temperature dependency of the viscosity of the brake fluid for ascertaining a functionality of a brake system component, a temperature signal may be dispensed with in carrying out this method. Thus, no additional signals/sensors are necessary for carrying out the method. Instead, pressure sensors which are generally already present in a brake system, for example a pressure sensor in the pressure accumulator and/or in the actuator circuit, may be used for carrying out the method.

In one refinement, the method may also include an additional method step in which an activation speed and/or an activation acceleration of the activation of the brake activating element is/are compared to a predefined minimum activation speed and/or to a predefined minimum activation acceleration, respectively. If the activation speed is greater than the predefined minimum activation speed and/or the activation acceleration is greater than the predefined minimum activation acceleration, yet a further method step may be carried out in which the determination of the functional state of the pressure build-up valve is suspended for a predefined time interval. For (very) heavy braking at a comparatively high activation speed and/or activation acceleration, such as panic braking in particular, it is thus possible to prevent a sudden pressure build-up being interpreted as a leak at the at least one pressure build-up valve. Thus, the method described herein also provides good robustness with respect to incorrect error recognition at the at least one pressure build-up valve.

FIG. 3 shows a coordinate system for illustrating an exemplary embodiment of the method for operating a hydraulic brake booster of a brake system, and of the method for operating a brake system having a hydraulic brake booster.

In the coordinate system in FIG. 3, the abscissa is a time axis t. Graph pDS(t) corresponds to the above-described pressure in the pressure accumulator at point in time t. The status of a pressure control at point in time t is represented by graph St(t). Graph I(t) corresponds to a current intensity of a current which flows through a warning light at point in time t. The operating mode of a hydraulic unit of the brake system at point in time t (hydraulic boost compensation) is represented by graph B(t).

In carrying out the method schematically represented in FIG. 3, the above-described method for determining a functional state of a pressure build-up valve is carried out. At point in time t0 a leak actually occurs at the at least one pressure build-up valve. (Thus, the pressure accumulator which has previously been completely charged is slowly emptied beginning at point in time t0.) This leak at the at least one pressure build-up valve may be detected relatively quickly at a point in time t1 (t1→t0). Due to the early detection of the leak at the at least one pressure build-up valve, this error state may also be responded to rapidly.

For example, an immediate or stepwise degradation of the hydraulic brake booster may begin starting at point in time t1. The hydraulic brake booster is preferably controlled from a full-function mode St1 (full system) into a standby mode St3/degraded state with the aid of a stepwise degradation. The stepwise degradation prevents a volume from the pressure accumulator from flowing into the actuator circuit in standby mode St3/degraded state. For this purpose, at point in time t1 the hydraulic brake booster may be controlled from full-function mode St1 into a pressure accumulator emptying mode St2 (decrease accu) in which the brake fluid still present in the pressure accumulator is discharged via a targeted activation of the at least one pressure reduction valve.

The hydraulic brake booster is preferably not ultimately degraded and controlled from pressure accumulator emptying mode St2 into standby mode St3 until a point in time t2 after which the pressure accumulator is completely empty. (Point in time t2 is reliably recognizable via the pressure accumulator signal.)

At the same time, a warning device may also be activated by controlling the hydraulic brake booster into pressure accumulator emptying mode St2. For example, a warning light may be activated as a warning device. For this purpose, a current intensity I(t) of zero flowing through the warning light at point in time t1 may be controlled to a value not equal to zero. Thus, based on the warning light lighting up, the driver has the option of recognizing that the brake system is not functioning properly. This ensures that the error present in the brake system may be eliminated early by a repair shop.

After determining a predefined error state as the functional state of the at least one pressure build-up valve, a hydraulic unit of the brake system may also be used as a brake booster. For this purpose, operating mode B(t) of the hydraulic unit may be adjusted at point in time t2 in such a way that the hydraulic unit increases a brake pressure which is built up in the at least one wheel brake caliper with the aid of the driver brake force. Since methods for this type of operation of the hydraulic unit are known, they are not discussed in greater detail here.

Thus, in one refinement the method achieves not only the specific recognition of the error "heavy inlet valve leak," but also a system response via which safety-critical states are avoidable. By the specific recognition of the error "heavy inlet valve leak," an optimized transition function for this error may also be carried out. At the same time, it is ensured that this optimized transition function is carried out only for this specific error profile.

What is claimed is:

1. A method for comprising:
   comparing, by evaluation circuitry, an activation intensity of an activation of a brake activating element of a brake system to a predefined minimum activation intensity; and
   in accordance with a result of the comparison, determining, by the evaluation circuitry, a functional state of a pressure build-up valve of a hydraulic brake booster of the brake system, such that:
      if the brake activation intensity is less than or equal to the minimum activation intensity, the determination of the functional state takes into account a pressure change over time in at least a partial volume of the hydraulic brake booster; and
      if the brake activation intensity is greater than the minimum activation intensity, the determination of the functional state takes, into account an operating mode which is predefined for a pressure reduction valve of the hydraulic brake booster.

2. The method according to claim 1, wherein the determination of the functional state, taking into account the pressure change over time in at least the partial volume of the hydraulic brake booster includes the following steps:
   ascertaining a pressure change variable with regard to a change in a pressure in a volume that is hydraulically connected to a pressure accumulator of the hydraulic brake booster via the pressure build-up valve;
   comparing the pressure change variable to a predefined limiting pressure change variable; and
   if the pressure change variable is greater than the limiting pressure change variable, determining a predefined error state as the functional state of the pressure build-up valve.

3. The method according to claim 1, wherein the determination of the functional state, taking into account the operating mode which is predefined for the pressure reduction valve of the hydraulic brake booster includes the following steps:
   comparing a current intensity signal which is provided to the pressure reduction valve, via which a discharge side of the pressure build-up valve is connected to a brake fluid reservoir, to a predefined limiting current intensity signal; and
   if the current intensity signal is greater than the limiting current intensity signal, determining a predefined error state as the functional state of the pressure build-up valve.

4. The method according to claim 2, wherein a gross leak state is determined as the predefined error state.

5. The method according to claim 3, wherein a gross leak state is determined as the predefined error state.

6. The method according to claim 1, further comprising:
   comparing at least one of an activation speed and an activation acceleration of the activation of the brake activating element to at least one of a predefined minimum activation speed and a predefined minimum activation acceleration, respectively, and if at least one of the activation speed is greater than the predefined minimum activation speed, and the activation acceleration is greater than the predefined minimum activation acceleration, suspending the determination of the functional state of the pressure build-up valve for a predefined time interval.

7. The method according to claim 1, further comprising:
responsive to a predefined error state being determined as the functional state of the pressure build-up valve, at least one of activating a warning device and controlling the hydraulic brake booster into a deactivated mode.

8. The method according to claim 1, further comprising:
responsive to a predefined error state being determined as the functional state of the pressure build-up valve, using a hydraulic unit of the brake system as the brake booster.

9. A method comprising:
determining, by evaluation circuitry while in a first operating mode, a functional state of a pressure build-up valve of a hydraulic brake booster of a brake system, the determination taking into account at least one provided first information item concerning a pressure change over time in at least a partial volume of the hydraulic brake booster; and determining, by the evaluation circuitry while in a second operating mode, the functional state of the pressure build-up valve taking into account at least one provided second information item concerning an operating mode which is predefined for a pressure reduction valve of the hydraulic brake booster.

10. The method according to claim 9, further comprising:
comparing a provided brake activation intensity variable to a predefined minimum activation intensity variable with regard to an activation intensity of an activation of a brake activating element of the brake system;

transitioning from the second operating mode into the first operating mode responsive to the brake activation intensity variable being less than or equal to the minimum activation intensity variable; and transitioning from the first operating mode into the second operating mode responsive to the brake activation intensity variable being greater than the minimum activation intensity variable.

11. The method according to claim 10, further comprising:
comparing a provided activation speed variable to a predefined minimum activation speed variable of the activation of the brake activating element; and responsive to the activation speed variable being greater than the predefined minimum activation speed variable, setting the evaluation circuitry to a deactivated mode for a predefined time interval.

12. The method according to claim 10, further comprising:
comparing a provided activation acceleration variable to a predefined minimum activation acceleration variable of the activation of the brake activating element; and responsive to the activation acceleration variable being greater than the predefined minimum activation acceleration variable, setting the evaluation circuitry to a deactivated mode for a predefined time interval.

13. The method according to claim 9, wherein the determining of the functional state in the first operating mode includes:
comparing a pressure change variable, provided as a first information item, to a predefined limiting pressure change variable with regard to a change in a pressure in a volume that is hydraulically connected to a pressure accumulator of the hydraulic brake booster via the pressure build-up valve; and responsive to the pressure change variable being greater than the limiting pressure change variable, determining a predefined error state as the functional state of the pressure build-up valve.

14. The method according to claim 9, wherein the determining of the functional state in the second operating mode includes:
comparing a current intensity signal, provided as a second information item, via which the pressure reduction valve, via which a discharge side of the pressure build-up valve is connected to a brake fluid reservoir, is controllable, to a predefined limiting current intensity signal; and responsive to the current intensity signal being greater than the limiting current intensity signal, determining a predefined error state as the functional state of the pressure build-up valve.

* * * * *